(12) United States Patent
Jiang

(10) Patent No.: US 9,445,257 B2
(45) Date of Patent: Sep. 13, 2016

(54) METHOD AND SYSTEM FOR PROVIDING CLOUD SUBSCRIBER IDENTITY MODULE (SIM)

(75) Inventor: John Yue Jun Jiang, Danville, CA (US)

(73) Assignee: GLOBETOUCH, INC., Oakland, CA (US)

( * ) Notice: Subject to any disclaimer, the term of this patent is extended or adjusted under 35 U.S.C. 154(b) by 0 days.

(21) Appl. No.: 14/237,340

(22) PCT Filed: Aug. 15, 2012

(86) PCT No.: PCT/US2012/050952
§ 371 (c)(1),
(2), (4) Date: Jul. 28, 2014

(87) PCT Pub. No.: WO2013/025806
PCT Pub. Date: Feb. 21, 2013

(65) Prior Publication Data
US 2015/0004967 A1     Jan. 1, 2015

Related U.S. Application Data

(60) Provisional application No. 61/523,731, filed on Aug. 15, 2011.

(51) Int. Cl.
*H04W 8/06* (2009.01)
*H04W 12/04* (2009.01)
*H04W 8/26* (2009.01)
(Continued)

(52) U.S. Cl.
CPC ............... *H04W 8/06* (2013.01); *H04L 67/04* (2013.01); *H04W 4/003* (2013.01); *H04W 8/26* (2013.01); *H04W 12/04* (2013.01); *H04W 60/00* (2013.01); *H04W 76/02* (2013.01)

(58) Field of Classification Search
CPC ..... H04W 8/06; H04W 60/00; H04W 76/02; H04W 8/04; H04W 8/26; H04W 8/20; H04W 8/065; H04W 84/042; H04W 12/04; H04W 12/06; H04W 60/005; H04L 67/04
USPC ......... 455/433, 432.3, 432.1, 415, 461, 453; 370/329, 216, 352
See application file for complete search history.

(56) References Cited

U.S. PATENT DOCUMENTS

2010/0048197 A1   2/2010   Jiang
2010/0128685 A1   5/2010   Jiang
(Continued)

FOREIGN PATENT DOCUMENTS

WO   WO 98/02011 A1    1/1998
WO   WO 2004/075579 A2   9/2004
(Continued)

OTHER PUBLICATIONS

International Search Report, International Application No. PCT/US2012/050952 mailing date Oct. 23, 2012.
(Continued)

*Primary Examiner* — Phuoc H Doan
(74) *Attorney, Agent, or Firm* — Arent Fox LLP

(57) ABSTRACT

The present invention provides a method and system for mobile communication where upon detecting a change in registration of a subscriber of a 5 client network at a visited operator, the subscribers client networks IMSI is switched to a hub operators IMSI. The hub operator is selected from a cloudSIM hub ecosystem, depending on the location of the subscriber. Thereafter, a cloudSIM hub converts between the signaling on the hub operators IMSI to signaling on the client operators IMSI. Further, the cloudSIM hub relays the converted signaling between 10 the visited operator and the client operator.

24 Claims, 3 Drawing Sheets

(51) Int. Cl.
*H04L 29/08* (2006.01)
*H04W 60/00* (2009.01)
*H04W 76/02* (2009.01)
*H04W 4/00* (2009.01)

(56) References Cited

U.S. PATENT DOCUMENTS

2010/0136967 A1\* 6/2010 Du et al. .................... 455/432.3
2010/0185537 A1 7/2010 Bari

FOREIGN PATENT DOCUMENTS

WO WO 2011/036484 A2 3/2011
WO WO 2011/041913 A1 4/2011

OTHER PUBLICATIONS

European Search Report issued on May 18, 2015; Application No. 12824113.0.

\* cited by examiner

METHOD AND SYSTEM FOR PROVIDING CLOUD SUBSCRIBER IDENTITY MODULE (SIM)

CROSS-REFERENCED TO RELATED APPLICATIONS

This application is a National Stage entry of International Application PCT/US2012/050952 filed Aug. 15, 2012, which claims priority to U.S. Provisional Patent Application 61/523,731 entitled "Dual IMSI Ecosystem", filed Aug. 15, 2011. The disclosures of each of these prior applications being hereby incorporated in their entirety by reference.

FIELD OF THE INVENTION

The present invention generally relates to mobile communication. More specifically, the invention relates to handling mobile communication while roaming.

BACKGROUND OF THE INVENTION

Roaming traffic contributes a significant percentage of an operator's revenue and even a better percentage of the operator's margin. With increasing competition and regulatory control, operators are being more pressured to increase their roaming revenue. Over the last few years, revenues to the network operators from home subscribers have consistently declined due to increased competition and resulting pricing pressures. On the other hand, revenues from roamers have consistently grown in the same period due to increased mobile penetration in local markets and an increase in travel.

As the global mobile roaming market business model is evolving, the industry understands the strategic importance of roaming to operator's revenues and profit margins and is adapting various newly proposed regulations. The operators understand that they must develop strategies for driving the number of roamers and roaming usage, while lowering tariff rates.

Amongst the roaming business, the average margins on inbound roaming revenue is around 80% and the average margins on outbound roaming revenue is around 20%. The key challenge lying before the operators is to maximize the outbound roaming revenues. While analyzing the outbound roaming revenues, it should be noted that on an average 40% of the outbound roaming revenues are contributed from Mobile Originated (MO) calls made by outbound roamers. Of these MO calls, almost 70% calls are back home and 10% are to other markets outside the current roaming destination of the subscribers. The revenue earned by the operator from these calls is minimal considering the revenue distribution between the current roaming network of the roamers and the destination network to where the call is made.

The roaming charges levied to a roamer for the outgoing calls made also constitute Inter Operator Tariffs and retail markups. The operators are increasingly coming under price pressure to offer better retail rates compared to wholesale tariff. The IOTs carry about 80% margin today whereas retail roaming charges carry only 20% margin. While the operators rely heavily on IOT discounting while setting up roaming agreements to maximize their roaming margins, the exception to the rule is outgoing international calls to other networks, the international outgoing calls continue to be expensive.

The key drivers constituting outbound roaming revenue are hence the Inter Operator Tariff, Termination Rates and Retail Markup. The operator can leverage the retail markup by selecting a "preferred partner" network that offers lesser IOT and lesser termination fees. There could also be an ecosystem of such preferred partner networks who offer each other discounted tariffs.

In accordance with the foregoing, there is a need in the art of a system, a method, for creating a solution that gives an operator the ways to leverage the ecosystem of preferred partner networks to enable a subscriber use a preferred network's IMSI while roaming, with the aim of maximizing the margin that accrues to the home operator. While the focus of the invention is on roaming, the methods can also be applied similarly to international calls too.

SUMMARY

The present invention is directed towards a method and system for mobile communication where upon detecting a change in registration of a subscriber of a client network at a visited operator, the subscriber's client network's IMSI is switched to a hub operator's IMSI. The hub operator is selected from a cloudSIM hub ecosystem, depending on the location of the subscriber. Thereafter, a cloudSIM hub converts between the signaling on the hub operator's IMSI to signaling on the client operator's IMSI. Further, the cloudSIM hub relays the converted signaling between the visited operator and the client operator.

The present invention provides a cloudSIM service that is an ecosystem that leverages mobile operators to offer discounted tariff to partner networks and client networks which have subscribed to the cloudSIM service and are a part of cloudSIM ecosystem. Each cloudSIM hub allocates a series of IMSIs which can be allocated by the client operator to its subscribers. Each client operator subscriber opting for this service is allocated a special multi-IMSI SIM card which consists of the client operator IMSI and a series of roaming IMSIs of hub partner operators of cloudSIM ecosystem as selected by the client operators. The roaming IMSIs are pre-provisioned in multi-IMSI SIM card.

The system and method of the present invention, in its various embodiments also facilitate addition of any additional IMSIs by downloading them using OTA platform. The additional IMSIs can also be added through a SIM applet (STK) that intelligently selects the right network for the service without any manual intervention from the end subscriber thus making the entire roamer experience seamless.

The system and method of the present invention, in its various embodiments provide the cloudSIM ecosystem that has multiple hub partner networks and client networks that subscribe to the cloudSIM service. The service offering that leverages Roamware's partnership with leading signaling and voice service providers around the world, to re-route the call via a cloudSIM hub that is deployed within the carrier cloud either in each hub operator or a central location for a group of hub operators. The subscriber's client network IMSI is switched with an IMSI from a hub operator depending on the location of the subscriber. The user experience for the roaming subscriber is not affected in any way, and he continues to enjoy normal roaming service while traveling.

BRIEF DESCRIPTION OF DRAWINGS

In the drawings, the same or similar reference numbers identify similar elements or acts.

DETAILED DESCRIPTION

In the following description, for purposes of explanation, specific numbers, materials and configurations are set forth in order to provide a thorough understanding of the present invention. It will be apparent, however, to one having ordinary skill in the art that the present invention may be practiced without these specific details. In some instances, well-known features may be omitted or simplified, so as not to obscure the present invention. Furthermore, reference in the specification to "one embodiment" or "an embodiment" means that a particular feature, structure or characteristic, described in connection with the embodiment, is included in at least one embodiment of the present invention. The appearance of the phrase "in an embodiment", in various places in the specification, does not necessarily refer to the same embodiment.

The present invention provides a system and a method for facilitating mobile communication for a subscriber of a Home Public Mobile Network (HPMN) roaming in a Visited Public Mobile Network (VPMN). In accordance with various embodiments, the present invention provides a method and system providing the subscriber a facility to use IMSI of a different operator other than his home operator's IMSI to offer better tariffs.

Figure 1:
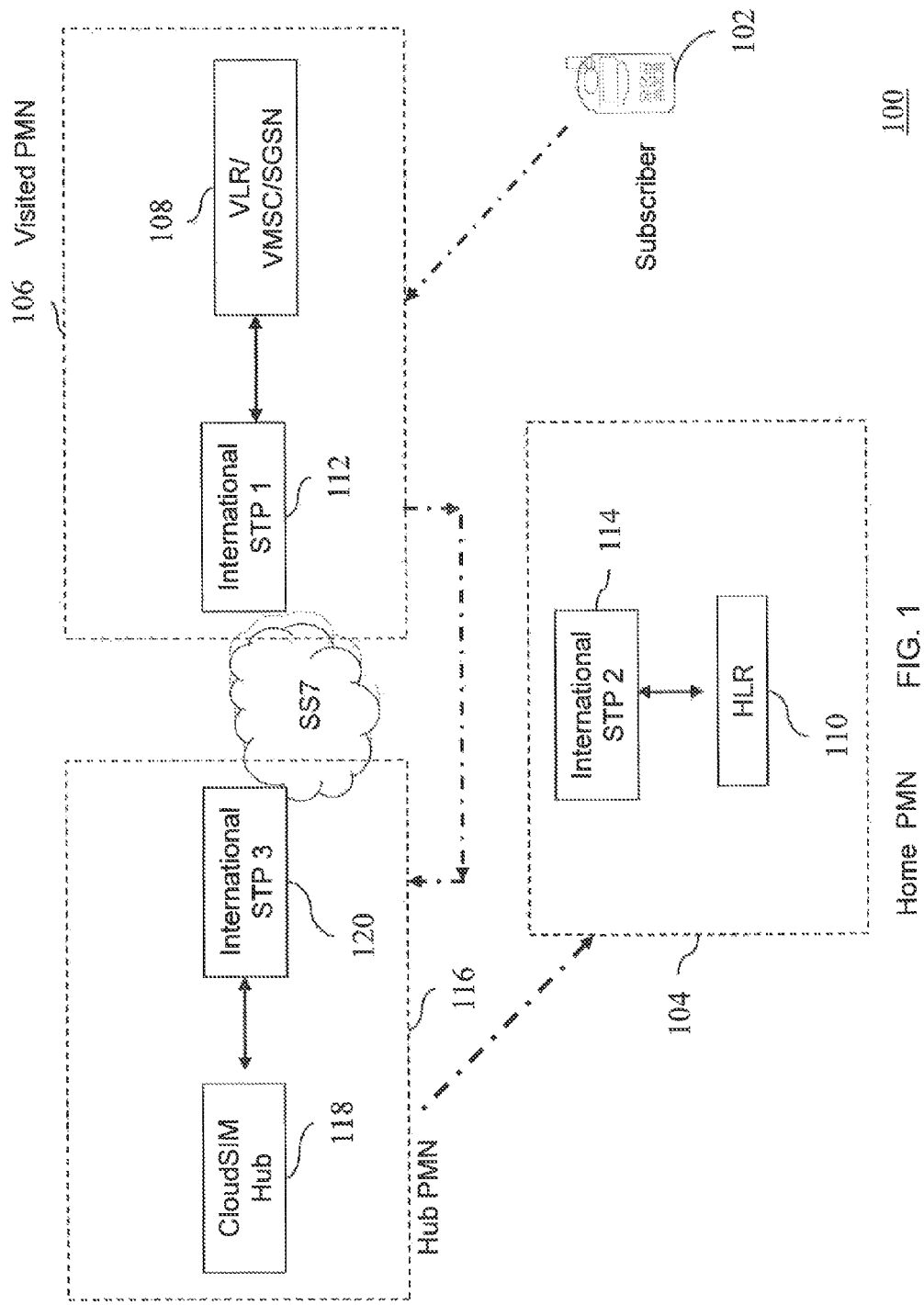
FIG. 1 illustrates a system for implementing cloudSIM service, in accordance with a first embodiment of the present invention.

FIG. 1 illustrates a system 100 for implementing cloudSIM service, in accordance with an embodiment of the present invention. A subscriber 102 of HPMN 104 (from home country) is roaming in a VPMN 106 (from visiting country). The subscriber 102 is connected to a VPMN VLR 108, when it is roaming outside HPMN 102. In one embodiment of the invention, VPMN VLR 108 is integrated with a VMSC in VPMN 106. Notwithstanding, both VPMN VLR and VMSC may have different logical addresses. Subscriber profile data corresponding to subscriber 102 is stored in HPMN HLR 110. The signaling corresponding to subscriber 102 is routed using an international STP 1 112 at VPMN 106 and international STP 2 114 at HPMN 104. The signaling between HPMN 104 and VPMN 106 is carried using SS7 signaling architecture 116. The signals exchanged between HPMN 104 and VPMN 106 are MAP based signals. Other network elements of HPMN 104 (e.g., MSC/VLR) communicate with various other network elements of VPMN 106 (e.g., HLR, VLR etc.) via the SS7 link. It will also be apparent to a person skilled in the art that various components of HPMN 104 communicate with VPMN 106 using various signaling techniques including, but not limited to, SS7, SIP, IP, ISUP etc.

The HPMN 104 subscribes to the cloudSIM service as client operator to enable provisioning of multiple IMSIs to its subscriber 102. The visited operator in VPMN 106 is the current location of the subscriber. The multiple IMSIs that are provisioned on subscriber's SIM belong to a hub PMN that is a part of cloudSIM ecosystem. In this embodiment, hub PMN 116 provides its IMSI to subscriber's SIM. The hub PMN 116 includes a cloudSIM hub 118 that interfaces with international STP 3 120 to manage the signaling across networks. The hub operator is either an MVNO, an MNO having its own set of IMSIs.

It will be apparent to a person skilled in the art that cloudSIM hub 118 can be present either on-net hub PMN 116 or off-net hub PMN 116. In other words, the cloudSIM hub 118 can be deployed in hub PMN 116 or at a central location that is serving multiple hub PMNs that are a part of cloudSIM ecosystem.

The cloudSIM ecosystem service leverages Roamware's ecosystem of cloudSIM hubs to offer special discounted tariff to the client operators who want to be a part of cloudSIM ecosystem. Each cloudSIM hub allocates a series of IMSIs which can be allocated by the client operator to its subscribers. Each client operator subscriber opting for this service is allocated a special multi-IMSI SIM card which consists of the client operator IMSI and a series of roaming IMSIs corresponding to the cloudSIM hubs as selected by the client operators. The roaming IMSIs are pre-provisioned in SIM card but any additional IMSIs can also be downloaded using OTA platform, in cases where the subscriber wants to avail coverage offered by an additional cloudSIM hub.

In order to explain how subscriber's 102 call is managed by the cloudSIM service, we take a use case scenario. Assume that subscriber 102 from UK (HPMN) roams into a destination VPMN 106 as Belgium. Now, when subscriber registers into an operator in Belgium, the SIM Toolkit Application (STK) in subscriber's SIM card detects subscriber's location as Belgium and then selects the right roaming IMSI which works in Belgium and makes that IMSI as active IMSI of subscriber. In this case, the active roaming IMSI could be an EU network IMSI (e.g. Italy) provided by the cloudSIM Hub in EU region and that IMSI works in any country in EU region. As a result client operator (i.e., HPMN 104) of subscriber 102 gets benefit of EU regulation on regional roaming and gets a discounted wholesale roaming rate. Subsequently, all signaling for that roaming subscriber flows via the cloudSIM hub network and cloudSIM hub (deployed in cloud SIM hub network) takes care of swapping of EU IMSI (roaming IMSI) with home (UK) IMSI and relay the signaling to the client network's (HPMN 104) HLR or SMSC or SCP so that the subscriber can use all the relevant services offered by home network. The billing settlement between the client operator and the hub operator of the chosen roaming IMSI is brokered via Roamware. The hub operator can also do billing settlement with the visited network.

In accordance with various embodiments of the invention, cloudSIM hub 118 converts one or more signaling parameters of signaling associated with the hub operator's IMSI to one or more signaling parameters of the signaling associated with the client operator's IMSI. The one or more signaling parameter could include MSISDN of the subscriber. In some cases, the subscriber's MSISDN is changed while communicating with the visited operator. Other signaling parameters include MAP signaling, call signaling, subscriber's MSISDN, CAMEL/SIP/TCAP transaction, data sessions and data traffic.

Figure 2:
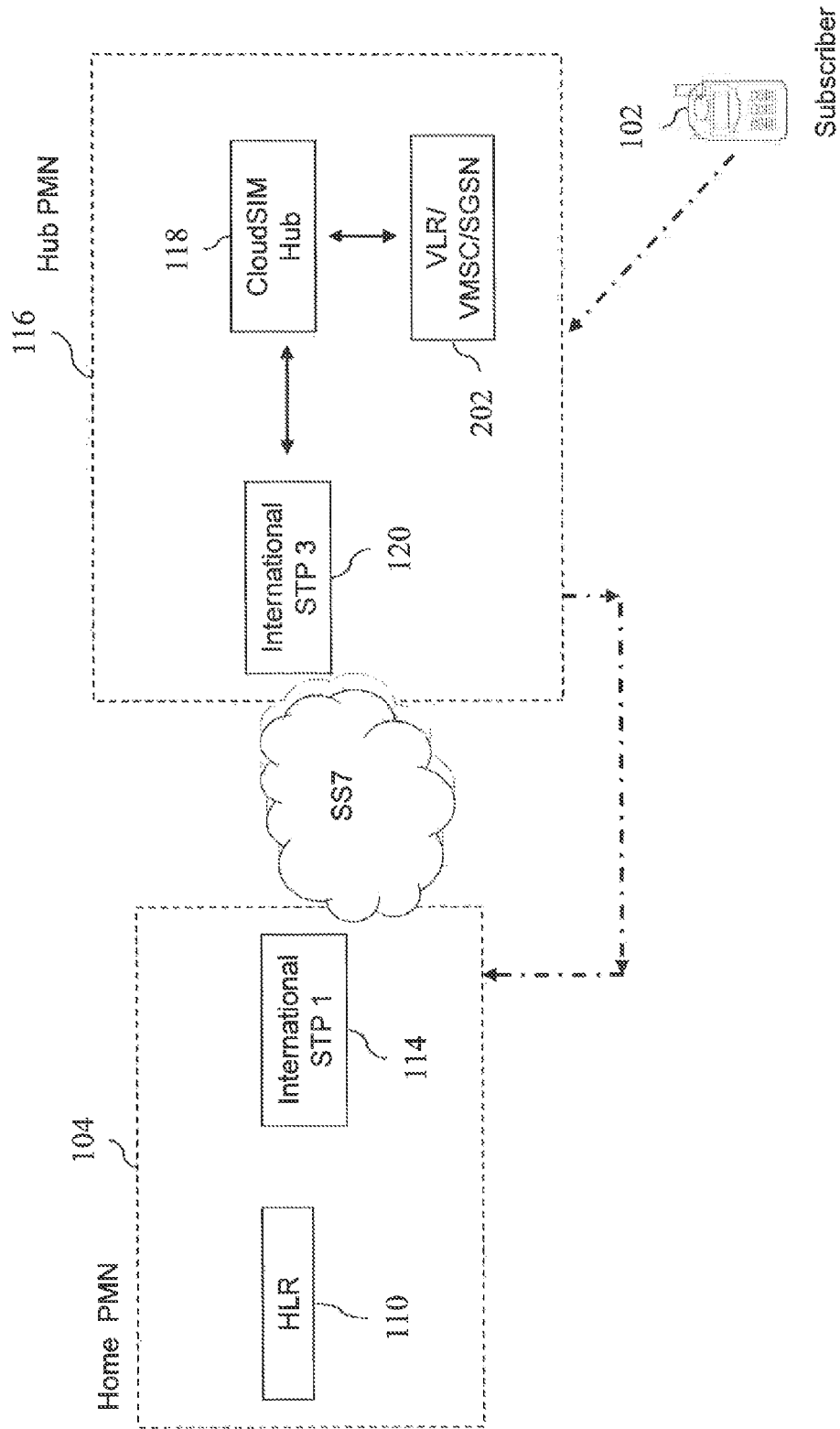
FIG. 2 illustrates a system for implementing cloudSIM service, in accordance with a second embodiment of the present invention.

In accordance with another embodiment of the invention, subscriber 102 may also register directly with a cloudSIM hub operator rather than a visited operator. FIG. 2 illustrates a system for implementing cloudSIM service, in accordance with a second embodiment of the present invention. In this case, subscriber 102 registers with a VLR/GMSC of hub PMN 116. To explain call handling in this embodiment, another use case example is taken. In a second use case scenario, let us assume us subscriber 102 from UK (HPMN) roams into a hub PMN as Mexico. Now, when subscriber registers into an operator in Mexico, the SIM STK in subscriber's SIM card detects subscriber's location as Mexico and selects the right roaming IMSI which works in Mexico and make that IMSI as active IMSI of subscriber. In this case, the active roaming IMSI will be a Mexican IMSI provided by Roamware's local cloudSIM Hub in Mexico region and this IMSI works in Mexico only. As a result the client operator gets benefit of local IMSI and can get discounted wholesale roaming rate. Subsequently, all signaling for that roaming subscriber flows via Roamware's cloudSIM hub installed in Mexico, which takes care of swapping of roaming (Mexico) IMSI with home (UK) IMSI and relay the signaling to the client network (UK) HLR or SMSC or SCP so that the subscriber can use all the relevant services offered by home Network. Again, in this case too, the billing settlement between the client operator and the hub operator of the chosen roaming IMSI is brokered via Roamware.

Figure 3:
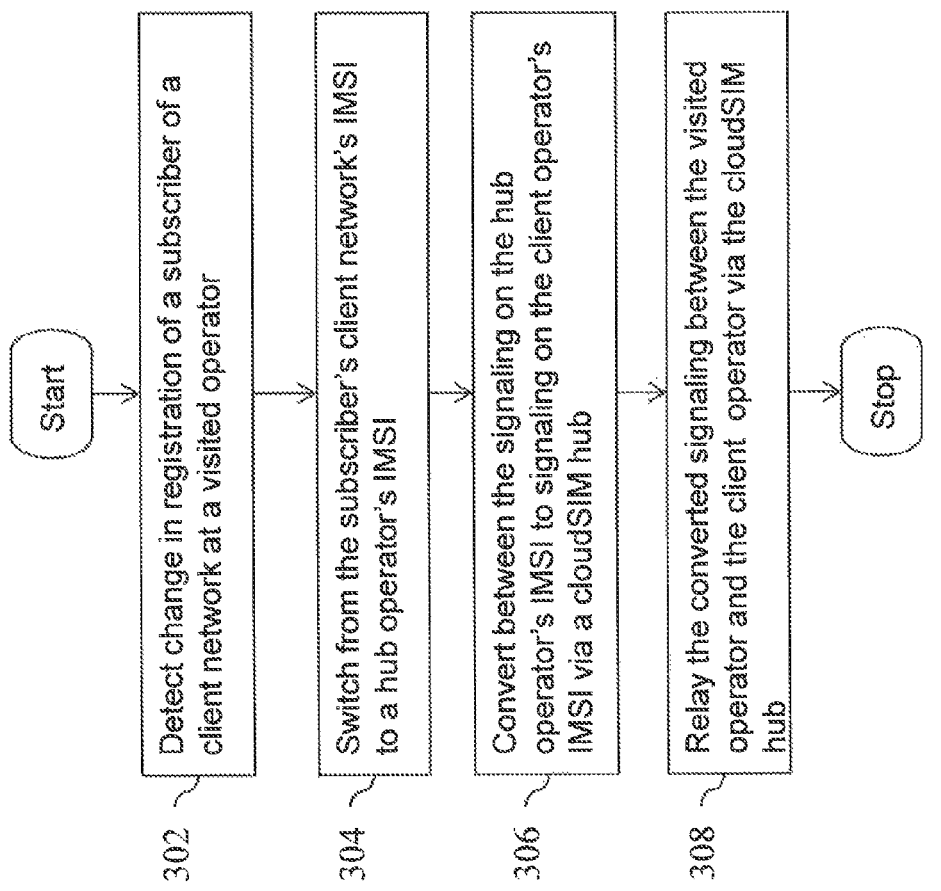
FIG. 3 represents a flowchart depicting method for enabling mobile communication using the cloudSIM service, in accordance with an embodiment of the present invention.

FIG. 3 represents a flowchart depicting method for enabling mobile communication using cloudSIM service, in accordance with an embodiment of the present invention. At step 302, subscriber's SIM STK or a network application detects a change in registration of a subscriber of a client network at a visited operator. Thereafter, at step 304, the subscriber's SIM STK switches from subscriber's client network's IMSI to a hub operator's IMSI. In accordance with an embodiment of the present invention, the change in subscriber's IMSI is based on at least one of a roaming location of the subscriber, class of the subscriber and a predefined logic. The subscriber's IMSI is changed via a configuration file. The configuration file can be changed via OTA communication. Alternatively, the subscriber's IMSI is changed by SIM STK application that communicates with network application via USSD, or SMS or any other bearer. Once the IMSI is switched, subsequently, at step 306, cloudSIM hub converts between the signaling on hub operator's IMSI to signaling on client operator's IMSI. Further at step 308, cloudSIM hub relays the converted signaling between the visited operator and the client operator.

The special multi-IMSI SIM cards are typically pre-provisioned with a set of roaming IMSIs for a set of destinations as chosen by the client operator initially. Now, if the client operator wants to offer few more destinations to its subscriber, the client operator just needs to update the contract with Roamware with additional destinations and Roamware can do an OTA campaign to download additional IMSIs in cloudSIM subscribers' SIM cards. This avoids the issues for SIM swapping.

In some cases, the subscriber's IMSI is changed to a default IMSI via the configuration file. The default IMSI is selected from a sequence of IMSIs in preference order or random order, until one IMSI is successfully registered with the visited network. In accordance with an embodiment of the present invention, the configuration file indicates to dynamically obtain an IMSI. In this case, the SIM is first registered with the default IMSI for the roaming location and then the SIM will request an IMSI via a USSD or SMS or other bearer channel (e.g. WiFi, GPRS, LTE etc.) for a dynamically assigned IMSI for the roaming location. The request then comes to the default IMSI hub, which then consults a central worldwide system or a system responsible for the IMSI assignment of the location (corresponding with the home IMSI) for a dynamically assigned IMSI for the roaming location for the subscriber. Thereafter, the IMSI is sent via OTA via USSD, SMS or other bearer channel in response to the IMSI request. The SIM then re-registers with the newly assigned IMSI.

In order to manage the billing, the cloudSIM service is set up a wholesale broker by Roamware, whose IMSI hub partners' IMSI and rates are resold with markup to client operators (including MNO, MVNO, and MVNE etc.). The subscriber is billed based on rates received from the hub operator of cloudSIM ecosystem. In order to handle billing for TAP and NRTRDE, cloudSIM hub charges a markup for the leg from the roaming partner IMSI to cloudSIM hub IMSI with roaming partner rate. Further for the leg from cloudSIM hub IMSI to client operator with markup from cloudSIM hub.

In accordance with various embodiments of the present invention, cloudSIM hub performs the following activities to provision cloudSIM service.

Reserves sequential blocks of IMSI(s) for client operators.

If it is not possible to allocate a large contiguous range (covering the entire IMSI range of sponsored network), then multiple small contiguous ranges are assigned but minimum block size is maintained at 5,000.

Reserves a block of GT's to represent serving MSC/VLR in international networks (4 to 5 GT's are required).

Reserves a Global Title per network element of client operators.

The dual IMSI SIM card of the subscriber has hub operator's Global Title allocated for SMSC of leveraging operator as service center address against the roaming IMSI (hub operator's IMSI).

The SMSC address in the SIM card against hub allocated IMSI is a hub allocated SMSC GT.

For every IMSI range reserved, hub GMSC is configured to route messages with SCCP Called Party address with Numbering Plan E.214 (MGT) to cloudSIM hub.

For every GTC allocated for representing client operator's network nodes, GMSC is configured to route messages with Called Party Address with allocated GT to cloudSIM hub.

For every GT allocated for representing visited international network's MSC/VLR, GMSC is configured to route messages with Called Party Address' initial (12) digits matching (partial match) reserved Global Titles to cloudSIM hub.

The SSN-149 is required to be allowed for cloudSIM hub point code for GPRS services.

The public IP addresses for the cloudSIM hub behaves as GGSN and SGSN.

The client operator's APNs is configured in hub network's DNS and the GGSN IP is configured as cloudSIM hub. Alternatively, the client operator provides a wildcard (like *.ve.mnc.mcc.gprs) in order to make provisioning easier.

For common APNs such as blackberry.net, the data traffic is routed through cloudSIM hub GGSN. Given the specific nature of Blackberry authentication and charging implementation, cloudSIM hub is required to ask Research In Motion to charge all blackberry traffic on ICCID and SFID, and not the IMSI received in the application level messages for Blackberry.

The cloudSIM hub has the ability to query hub operator's DNS.

Signaling interconnection is required between client operator and cloudSIM hub.

Data interconnection is required between client operator and cloudSIM hub

The cloudSIM hub segregates the service usage records for usage made on local or roaming using cloudSIM hub IMSIs and generates TAP files towards Roamware's identified Data Clearing House (DCH).

In accordance with various embodiments of the present invention, the client operator requires the following logistic requirements in order to provision cloudSIM service to its subscriber.

The client operator needs to provide special Multi-IMSI SIM cards for its cloudSIM subscribers. The subscriber's local number should not change. The multi-IMSI SIM card contains client operator's IMSI along with one or more IMSIs for different regions/destination.

The client operator need to open its routing for GT's published by Roamware for each of its hub of who's services are availed by the client operator to represent serving MSC/VLR in international networks.

The cloudSIM SIM card should have corresponding cloudSIM hub's GT allocated for SMSC of leveraging operator as service center address against each IMSI provisioned from the cloudSIM service on the multi-IMSI SIM card.

The SMSC address in the SIM card against hub allocated IMSI is configured to be a hub allocated SMSC GT.

The SSN-149 is required to be allowed for cloudSIM hub's point code for GPRS services.

The SSN-146 is required to be allowed for cloudSIM hub's point code for CAMEL services.

The client operator provides a wildcard (like *.ve.mnc.mcc.gprs) in order to make provisioning easier.

In addition to the above, the client operator needs to enable SIM logistics that includes:

SIM application

Off-the-shelf OTA service for the deployment and configuration of the applet.

The cloudSIM service is essentially a SIM-based solution, which manages multiple IMSIs for the subscriber. The home IMSI is used in the subscriber's home country, and when roaming to any country where the operator has a bilateral agreement in place. The international IMSI is used when abroad for connection to the cloudSIM Hub or allowed bilateral roaming relationship of cloudSIM Hub. The switching between the two IMSIs is handled automatically by an intelligent application residing on the SIM Card, depending on location of the subscriber.

The SIM card is provisioned with multiple IMSI, with IMSI containing relevant information pertaining to supported networks (PLMNs), Access Control Class, Service Provider Name, Service Provider Display Information and Short Message Service Parameters etc. The SIM card is usually provisioned with the dual IMSI applet and home IMSI. It is also possible to download the dual IMSI applet using OTA. OTA is used as well to add/delete foreign IMSIs with their corresponding characteristics to enable usage abroad in selected networks. The OTA campaign is required whenever the subscriber opts for a new destination or opts out of existing supported destinations. The campaign can also be scheduled by the home operator depending on their rules and preference.

Each SIM card contains three standardized files used during location update while roaming. These files are List of preferred roaming partners Current registered network List of forbidden networks Once the handset is powered on and the current location/network is detected, the SIM Card receives the necessary events from the mobile phone equipment informing the current location of the subscriber. Based on this location, the applet loaded on SIM processes the files provisioned to select the appropriate IMSI and subsequently use that IMSI to register with the appropriate network. In case, the coverage to appropriate network is lost, the file is re-scanned by the applet and the re-selection of appropriate network/IMSI combination is done. However if none of the available network is provisioned to be selected by foreign IMSIs the applet restores the identity to the home IMSI and uses the home IMSI to access the available network.

All throughout the user experience is seamless and non-intrusive. All the operations pertaining to SIM card management, applet download and IMSI management as well as network selection are transparent to the user thus making the entire roaming experience very easy. It will be apparent to a person skilled in the art that all services are available on home number and hence user experience does not change. In addition to this, in selected countries, subject to local regulations, local numbers may be available along with IMSIs which can be used by the end user of the service.

The cloudSIM ecosystem help the cloudSIM client networks to provide services to its outbound roamers across international borders at the costs much lower than incurred during traditional roaming arrangements. This is done by leveraging use of local/regional IMSIs made available through Roamware's global cloudSIM alliance. The operators are also benefited To offer a competitive roaming tariff to subscribers To overcome competition from international SIM card providers To tap additional revenue from M2M services which are of global nature e.g. Transportation, shipping etc.

To increase outbound roaming footprint for CAMEL, GPRS or 3G.

The cloudSIM ecosystem also helps the cloudSIM hub operators on following parameters:

Get additional inbound traffic from new networks/subscriber base of the client operators who would leverage the attractive service rates offered by the cloudSIM hubs.

Get additional inbound traffic from cost conscious travellers who prefer to use alternate channels of communication.

Tap additional revenue from M2M services which are of global nature e.g. transportation, shipping etc.

Offer additional outbound traffic to their roaming partners and increase volume offered to these partners to leverage on additional discounts The additional benefits from cloudSIM ecosystem for the cloudSIM hub operators are given below:

One contract with Roamware to cover inbound roaming traffic globally from Roamware customers globally.

Operational convenience of standard roaming operations usage transfer using tap files. All other operational items would be same as signing up a roaming partner.

No risk of traffic being steered by roaming partners.

It will be apparent to a person skilled in the art, that the present invention can also be applied to Code Division Multiple Access (CDMA)/American National Standards Institute #41D (ANSI-41D), and various other technologies such as, but not limited to, VoIP, WiFi, 3GSM and inter-standard roaming. In one exemplary case, a CDMA outbound roamer travels with an HPMN CDMA handset. In another exemplary case, the CDMA outbound roamer travels with an HPMN GSM SIM and a GSM handset. In yet another exemplary case, GSM outbound roamer travels with an HPMN CDMA RUIM and a CDMA handset. To support these variations, system 100 will have a separate SS7 and network interfaces, corresponding to both the HPMN and VPMN networks. It will also be apparent to a person skilled in the art that these two interfaces in different directions may not have to be the same technologies. Moreover, there could be multiple types of interface in both directions.

An exemplary list of the mapping between GSM MAP and ANSI-41D is described in the table below as a reference.

| GSM MAP | ANSI-41D |
|---|---|
| Location Update/ISD | REGNOT |
| Cancel Location | REGCAN |
| RegisterSS | FEATUREREQUEST |
| InterrogateSS | FEATUREREQUEST |
| SRI-SM | SMSREQ |
| SRI | LOCATION REQUEST |
| ForwardSMS | SMSDPP |
| ReadyForSMS | SMSNOTIFICATION |
| AlertServiceCenter | SMSNOTIFICATION |
| ReportSMSDelivery | SMDPP |
| ProvideRoamingNumber | ROUTING REQUEST |

The present invention can take the form of an entirely hardware embodiment, an entirely software embodiment, or an embodiment containing both hardware and software elements. In accordance with an embodiment of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

The components of present system described above include any combination of computing components and devices operating together. The components of the present system can also be components or subsystems within a larger computer system or network. The present system components can also be coupled with any number of other components (not shown), such as other buses, controllers, memory devices, and data input/output devices, in any number of combinations. In addition, any number or combination of other processor-based components may be carrying out the functions of the present system.

It should be noted that the various components disclosed herein may be described using computer aided design tools and/or expressed (or represented), as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Unless the context clearly requires otherwise, throughout the description and the claims, the words "comprise," "comprising," and the like are to be construed in an inclusive sense as opposed to an exclusive or exhaustive sense; that is to say, in a sense of "including, but may not be limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, it covers all of the following interpretations: any of the items in the list, all of the items in the list and any combination of the items in the list.

The above description of illustrated embodiments of the present system is not intended to be exhaustive or to limit the present system to the precise form disclosed. While specific embodiments of, and examples for, the present system are described herein for illustrative purposes, various equivalent modifications are possible within the scope of the present system, as those skilled in the art will recognize. The teachings of the present system provided herein can be applied to other processing systems and methods. They may not be limited to the systems and methods described above.

The elements and acts of the various embodiments described above can be combined to provide further embodiments. These and other changes can be made in light of the above detailed description.

Other Variations

Provided above for the edification of those of ordinary skill in the art, and not as a limitation on the scope of the invention, are detailed illustrations of a scheme for proactive roaming tests, discoveries of roaming partner services and discoveries of frauds in roaming using simulated roaming traffic. Numerous variations and modifications within the spirit of the present invention will of course occur to those of ordinary skill in the art in view of the embodiments that have been disclosed. For example, the present invention is implemented primarily from the point of view of GSM mobile networks as described in the embodiments. However, the present invention may also be effectively implemented on GPRS, 3G, CDMA, WCDMA, WiMax etc., or any other network of common carrier telecommunications in which end users are normally configured to operate within a "home" network to which they normally subscribe, but have the capability of also operating on other neighboring networks, which may even be across international borders.

The examples under the system of present invention detailed in the illustrative examples contained herein are described using terms and constructs drawn largely from GSM mobile telephony infrastructure. However, use of these examples should not be interpreted as limiting the invention to those media. The system and method can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of the system under the present invention, this specification follows the path of a telecommunications call, from a calling party to a called party. For the avoidance of doubt, such a call can be a normal voice call, in which the subscriber telecommunications equipment is also capable of visual, audiovisual or motion-picture display. Alternatively, those devices or calls can be for text, video, pictures or other communicated data.

In the foregoing specification, specific embodiments of the present invention have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of present invention. The benefits, advantages, solutions to problems, and any element(s) that may cause any benefit, advantage, or solution to occur, or to become more pronounced, are not to be construed as a critical, required, or essential feature or element of any or all of the claims.

TECHNICAL REFERENCES

GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS)
(GSM 03.40 version 7.4.0 Release 1998)
GSM 378 on CAMEL,
GSM 978 on CAMEL Application Protocol,
GSM 379 on CAMEL Support of Optimal Routing (SOR),
GSM 318 on CAMEL Basic Call Handling
ITU-T Recommendation Q.1214 (1995), Distributed functional plane for intelligent network CS-1,
ITU-T Recommendation Q.1218 (1995), Interface Recommendation for intelligent network CS-1,
ITU-T Recommendation Q.762 (1999), Signaling system No. 7—ISDN user part general functions of messages and signals,
ITU-T Recommendation Q.763 (1999), Signaling system No. 7—ISDN user part formats and codes,
ITU-T Recommendation Q.764 (1999), Signaling system No. 7—ISDN user part signaling procedures,
ITU-T Recommendation Q.765 (1998), Signaling system No. 7—Application transport mechanism,
ITU-T Recommendation Q.766 (1993), Performance objectives in the integrated services digital network application,
ITU-T Recommendation Q.769.1 (1999), Signaling system No. 7—ISDN user part enhancements for the support of Number Portability

APPENDIX

| Acronym | Description |
| --- | --- |
| 3G | Third generation of mobile |
| ACM | ISUP Address Completion Message |
| ANM | ISUP Answer Message |
| ANSI-41 | American National Standards Institute #41 |
| ATI | Any Time Interrogation |
| BCSM | Basic Call State Model |
| BSC | Base Station Controller |
| BOIC | Barring Outgoing International Calls |
| BOIC-EX-Home | Barring Outgoing International Calls except to home country |
| CAMEL | Customized Application for Mobile Enhanced Logic |
| CAP | Camel Application Part |
| CB | Call Barring |
| CC | Country Code |
| CDMA | Code Division Multiplexed Access |
| CdPA | Called Party Address |
| CDR | Call Detail Record |
| CF | Call Forwarding |
| CgPA | Calling Party Address |
| CIC | Circuit Identification Code |
| CLI | Calling Line Identification |
| CSD | Circuit Switched Data |
| CSI | Camel Subscription Information |
| DPC | Destination Point Code |
| DSD | Delete Subscriber Data |
| DTMF | Dual Tone Multi-Frequency |
| ERB | CAP Event Report Basic call state model |
| EU | European Union |
| FPMN | Friendly Public Mobile Network |
| FTN | Forward-To-Number |
| GLR | Gateway Location Register |
| GGSN | Gateway GPRS Support Node |
| GMSC | Gateway MSC |
| GMSC-F | GMSC in FPMN |
| GMSC-H | GMSC in HPMN |
| GPRS | General Packet Radio System |
| GSM | Global System for Mobile |
| GSMA | GSM Association |
| GSM SSF | GSM Service Switching Function |
| GsmSCF | GSM Service Control Function |
| GT | Global Title |
| GTP | GPRS Tunnel Protocol |
| HLR | Home Location Register |
| HPMN | Home Public Mobile Network |
| IN | Intelligent Network |
| IOT | Inter-Operator Tariff |
| GTT | Global Title Translation |
| IAM | Initial Address Message |
| IDP | Initial DP IN/CAP message |
| IDD | International Direct Dial |
| IMSI | International Mobile Subscriber Identity |
| IMSI-H | HPMN IMSI |
| IN | Intelligent Network |
| INAP | Intelligent Network Application Part |
| INE | Interrogating Network Entity |
| IP | Internet Protocol |
| IREG | International Roaming Expert Group |
| IRS | International Revenue Share |
| ISC | International Service Carrier |
| ISD | MAP Insert Subscriber Data |
| ISG | International Signal Gateway |
| IST | Immediate Service Termination |
| ISTP | International STP |
| ISTP-F | ISTP connected to FPMN STP |
| ISTP-H | ISTP connected to HPMN STP |
| ISUP | ISDN User Part |
| ITPT | Inbound Test Profile Initiation |
| ITR | Inbound Traffic Redirection |
| IVR | Interactive Voice Response |
| LU | Location Update |
| LUP | MAP Location Update |
| MAP | Mobile Application Part |
| MCC | Mobile Country Code |
| MCC | Mobile Country Code |
| MD | Missing Data |

| Acronym | Description |
|---|---|
| ME | Mobile Equipment |
| MGT | Mobile Global Title |
| MMS | Multimedia Message Service |
| MMSC | Multimedia Message Service Center |
| MMSC-F | FPMN MMSC |
| MMSC-H | HPMN MMSC |
| MNC | Mobile Network Code |
| MNP | Mobile Number Portability |
| MO | Mobile Originated |
| MOS | Mean Opinion Score |
| MS | Mobile Station |
| MSC | Mobile Switching Center |
| MSISDN | Mobile Station International Subscriber Directory Number |
| MSISDN-F | FPMN MSISDN |
| MSISDN-H | HPMN MSISDN |
| MSRN | Mobile Station Roaming Number |
| MSRN-F | FPMN MSRN |
| MSRN-H | HPMN MSRN |
| MT | Mobile Terminated |
| MTP | Message Transfer Part |
| NDC | National Dialing Code |
| NP | Numbering Plan |
| NPI | Numbering Plan Indicator |
| NRTRDE | Near Real Time Roaming Data Exchange |
| O-CSI | Originating CAMEL Subscription Information |
| OCN | Original Called Number |
| ODB | Operator Determined Barring |
| OPC | Origination Point Code |
| OR | Optimal Routing |
| ORLCF | Optimal Routing for Late Call Forwarding |
| OTA | Over The Air |
| OTPI | Outbound Test Profile Initiation |
| PDP | Protocol Data Packet |
| PDN | Packet Data Network |
| PDU | Packet Data Unit |
| PRN | MAP Provide Roaming Number |
| PSI | MAP Provide Subscriber Information |
| QoS | Quality of Service |
| RAEX | Roaming Agreement EXchange |
| RI | Routing Indicator |
| RIS | Roaming Intelligence System |
| RDN | Redirecting Number |
| RNA | Roaming Not Allowed |
| RR | Roaming Restricted due to unsupported feature |
| RRB | CAP Request Report Basic call state model |
| RSD | Restore Data |
| RTP | Real-Time Transport Protocol |
| SAI | Send Authentication Info |
| SC | Short Code |
| SCA | Smart Call Assistant |
| SCCP | Signal Connection Control part |
| SCP | Signaling Control Point |
| SF | System Failure |
| SG | Signaling Gateway |
| SGSN | Serving GPRS Support Node |
| SGSN-F | FPMN SGSN |
| SIM | Subscriber Identity Module |
| SIGTRAN | Signaling Transport Protocol |
| SME | Short Message Entity |
| SM-RP-UI | Short Message Relay Protocol User Information |
| SMS | Short Message Service |
| SMSC | Short Message Service Center |
| SMSC-F | FPMN SMSC |
| SMSC-H | HPMN SMSC |
| SoR | Steering of Roaming |
| SPC | Signal Point Code |
| SRI | MAP Send Routing Information |
| SRI-SM | MAP Send Routing Information For Short Message |
| SS | Supplementary Services |
| SS7 | Signaling System #7 |
| SSN | Sub System Number |
| SSP | Service Switch Point |
| STK | SIM Tool Kit Application |
| STP | Signal Transfer Point |
| STP-F | FPMN STP |
| STP-H | HPMN STP |
| TADIG | Transferred Account Data Interchange Group |
| TAP | Transferred Account Procedure |
| TCAP | Transaction Capabilities Application Part |
| VT-CSI | Visited Terminating CAMEL Service Information |
| TP | SMS Transport Protocol |
| TR | Traffic Redirection |
| TS | Traffic Steering |
| TE | Termination Ecosystem |
| TT | Translation Type |
| UD | User Data |
| UDH | User Data Header |
| UDHI | User Data Header Indicator |
| USSD | Unstructured Supplementary Service Data |
| VAS | Value Added Service |
| VIP | Very Important Person |
| VLR | Visited Location Register |
| VLR-F | FPMN VLR |
| VLR-H | HPMN VLR |
| VLR-V | VPMN VLR |
| VMSC | Visited Mobile Switching Center |
| VoIP | Voice over IP |
| VPMN | Visited Public Mobile Network |
| ATI | Access Transport Information |
| UDV | Unexpected Data Value |
| USI | User Service Information |
| WAP | Wireless Access Protocol |

I claim:

1. A method for mobile communication, the method comprising:
registering a client network to a cloudSIM service at a hub operator, the cloudSIM service having a plurality of roaming International Mobile Subscriber Identities (IMSIs);
provisioning on a subscriber device of the client network a set of the plurality of roaming IMSIs selected by the client network;
detecting, by the subscriber device, registration of the subscriber device to a visitor network and switching, by the subscriber device, from a client network IMSI on the subscriber device to one IMSI selected from the set of roaming IMSIs depending on a location of the visitor network;
converting, by the hub operator, signaling on the selected one IMSI to signaling on the client network IMSI; and
relaying, by the hub operator, the converted signaling from the visitor network to the client network.

2. The method of claim 1, further comprising converting, by the hub operator, one or more signaling parameters of the signaling associated with the selected one IMSI to one or more signaling parameters of the signaling associated with the client network IMSI.

3. The method of claim 2, wherein the one or more signaling parameters comprises at least one of Mobile Application Part (MAP) signaling, call signaling, subscriber's Mobile Station International Subscriber Directory Number (MSISDN), Customized Application for Mobile Enhanced Logic (CAMEL)/Session Initiation Protocol (SIP)/Transaction Capabilities Application Part (TCAP) transaction, data sessions and data traffic.

4. The method of claim 1, wherein the hub operator is one of a Mobile Virtual Network Operator (MVNO), mobile network operator (MNO), having its own set of IMSIs.

5. The method of claim 1, wherein the hub operator is located either on an on-net hub operator or on an off-net hub operator.

6. The method of claim 1, wherein the switching to the one IMSI selected from the set of roaming IMSIs is based on at least one of a roaming location of the subscriber device, a class of the subscriber device and a predefined logic.

7. The method of claim 1, wherein the switching to the one IMSI selected from the set of roaming IMSIs comprises changing via a configuration file.

8. The method of claim 7, wherein the configuration file can be changed by Over the Air (OTA).

9. The method of claim 1, further comprising changing the IMSI of the subscriber device is changed to a default IMSI via a configuration file.

10. The method of claim 9, wherein the default IMSI is selected from a sequence of IMSIs in preference order or random order, until one IMSI is successfully registered with the visited network.

11. The method of claim 1, wherein the switching to the one IMSI selected from the set of roaming IMSIs is switched by a Subscriber Identity Module (SIM), SIM Tool Kit (STK), application that communicates with network application via one of Unstructured Supplementary Service Data (USSD), Short Message Service (SMS) and other bearer.

12. The method of claim 1, wherein the subscriber device is billed based on rates from the hub operator.

13. A system for mobile communication, the system comprising:
a CloudSIM hub ecosystem associated with a plurality of hub operators and client networks, wherein a client network registers to a cloudSIM service at a hub operator, the cloudSIM service having a plurality of roaming International Mobile Subscriber Identities (IMSIs);
the client network providing on a subscriber device of the client network a set of the plurality of roaming IMSIs selected by the client network;
the subscriber device detecting registration to a visitor network and switching from a client network IMSI on the subscriber device to one IMSI selected from the set of roaming IMSIs depending on a location of the visitor network;
the hub operator converting signaling on the selected one IMSI to signaling on the client network IMSI; and
the hub operator relaying the converted signaling from the visitor network to the client network.

14. The system of claim 13, hub operator, one or more signaling parameters of the signaling associated with the selected one IMSI to one or more signaling parameters of the signaling associated with the client network IMSI.

15. The system of claim 14, wherein the one or more signaling parameters comprises at least one of Mobile Application Part (MAP) signaling, call signaling, subscriber's Mobile Station International Subscriber Directory Number (MSISDN), Customized Application for Mobile Enhanced Logic (CAMEL)/Session Initiation Protocol (SIP)/Transaction Capabilities Application Part (TCAP) transaction, data sessions and data traffic.

16. The system of claim 13, wherein the hub operator is one of a Mobile Virtual Network Operator (MVNO), mobile network operator (MNO), having its own set of IMSIs.

17. The system of claim 13, wherein the hub operator is located either on an on-net hub operator or on an off-net hub operator.

18. The system of claim 13, wherein the subscriber device switches to the one IMSI selected from the set of roaming IMSIs is based on at least one of a roaming location of the subscriber device, a class of the subscriber device and a predefined logic.

19. The system of claim 13, wherein the subscriber device switches to the one IMSI selected from the set of roaming IMSIs comprises changing via a configuration file.

20. The system of claim 19, wherein the configuration file can be changed by Over the Air (OTA).

21. The system of claim 13, the IMSI of the subscriber device is changed to a default IMSI via a configuration file.

22. The system of claim 21, wherein the default IMSI is selected from a sequence of IMSIs in preference order or random order, until one IMSI is successfully registered with the visited network.

23. The system of claim 13, wherein the subscriber device switches to the one IMSI selected from the set of roaming IMSIs is switched by a Subscriber Identity Module (SIM), SIM Tool Kit (STK), application that communicates with network application via one of Unstructured Supplementary Service Data (USSD), Short Message Service (SMS) and other bearer.

24. The system of claim 13, wherein the subscriber vice is billed based on rates from the hub operator.

* * * * *